United States Patent [19]
Sekar

[11] Patent Number: 5,195,242
[45] Date of Patent: Mar. 23, 1993

[54] METHOD OF MAKING A PAINT ROLLER

[75] Inventor: Chandra Sekar, 2586 Overlook Pl., Baldwin, N.Y. 11510

[73] Assignee: Chandra Sekar, Baldwin, N.Y.

[21] Appl. No.: 897,579

[22] Filed: Jun. 11, 1992

Related U.S. Application Data

[63] Continuation of Ser. No. 806,809, Dec. 6, 1991, abandoned, which is a continuation of Ser. No. 660,970, Feb. 26, 1991, abandoned, which is a continuation of Ser. No. 512,795, Apr. 25, 1990, abandoned, which is a continuation-in-part of Ser. No. 394,073, Aug. 15, 1989, abandoned.

[51] Int. Cl.$^5$ .............................................. B32B 31/00
[52] U.S. Cl. .................... 29/895.21; 29/895; 29/527.2; 29/120; 29/131; 156/187
[58] Field of Search .................... 29/DIG. 1, 120, 127, 29/130, 131, 132, 895, 895.2, 895.21, 527.2; 156/187, 188, 189; 118/257, DIG. 11; 15/230.12, 230.13

[56] References Cited

U.S. PATENT DOCUMENTS

| | | | |
|---|---|---|---|
| 3,126,306 | 3/1964 | Sherman | 156/187 |
| 3,366,719 | 1/1968 | Lueders | 264/47 |
| 3,457,150 | 7/1969 | Morrison | 156/190 |
| 3,607,492 | 9/1971 | Keith et al. | 156/79 |
| 3,620,869 | 9/1971 | Stump et al. | 156/190 |
| 3,700,520 | 10/1972 | Hielema | 156/162 |
| 4,010,054 | 3/1977 | Bradt | 156/173 |
| 4,078,957 | 3/1978 | Bradt | 156/173 |
| 4,192,697 | 3/1980 | Parker et al. | 156/188 |
| 4,692,975 | 9/1987 | Garcia | 29/120 |
| 5,137,595 | 8/1992 | Garcia | 156/187 X |

FOREIGN PATENT DOCUMENTS 1928269  12/1970  Fed. Rep. of Germany ...... 156/188

Primary Examiner—Mark Rosenbaum
Assistant Examiner—S. Thomas Hughes
Attorney, Agent, or Firm—Cohen, Pontani, Lieberman, Pavane

[57] ABSTRACT

A method and apparatus for making reusable paint rollers comprised of a core formed from thermoplastic material. The thermoplastic material is formed into a core about a stationary mandril. An adhesive is then applied to the core whereupon a cover is bonded thereto. In a first embodiment the core is formed by winding a plurality of thermoplastic strips about the mandril. In a second embodiment the core is formed by applying liquefied thermoplastic material to a driven belt which transfers the thermoplastic material to the mandril.

12 Claims, 2 Drawing Sheets

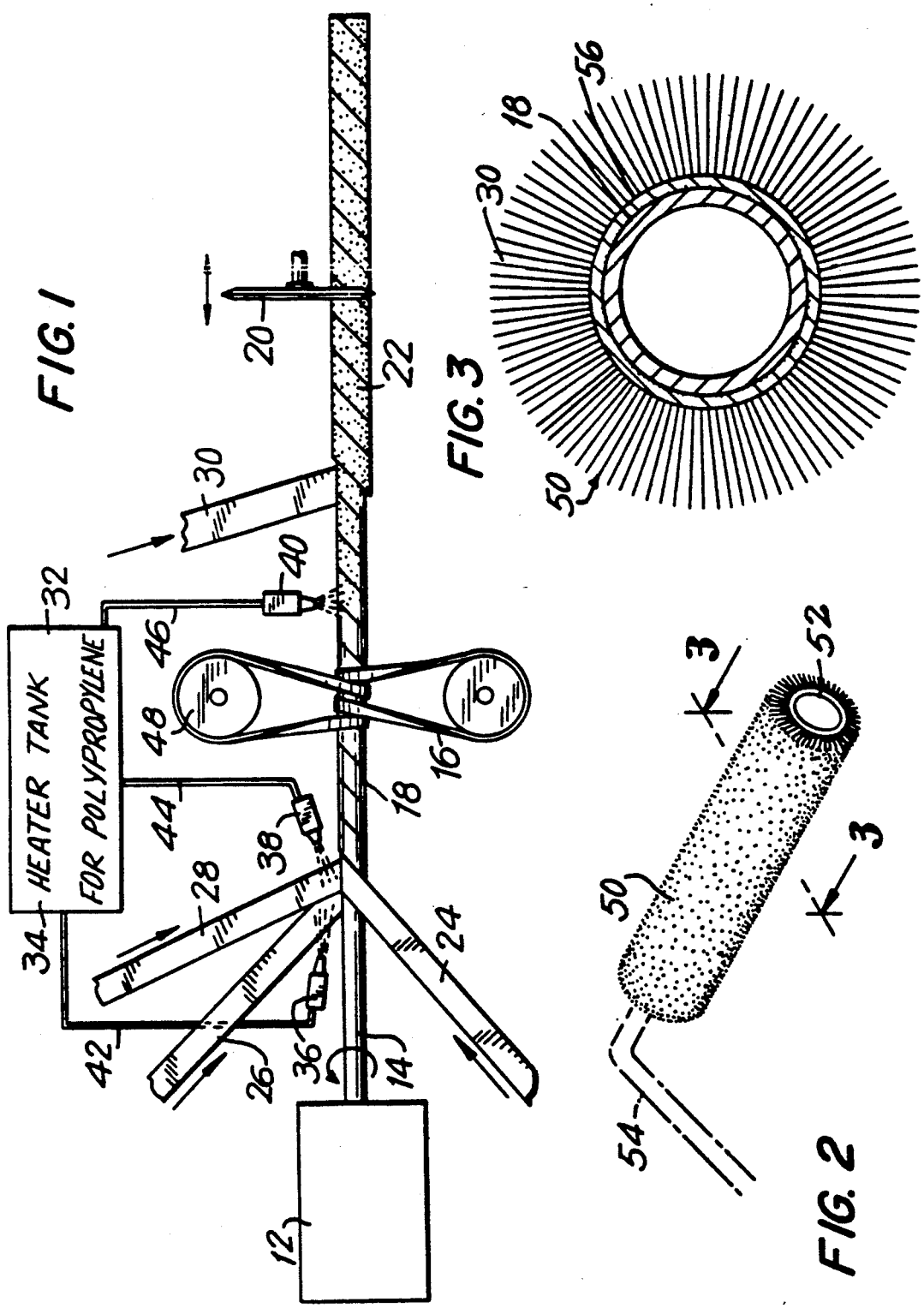

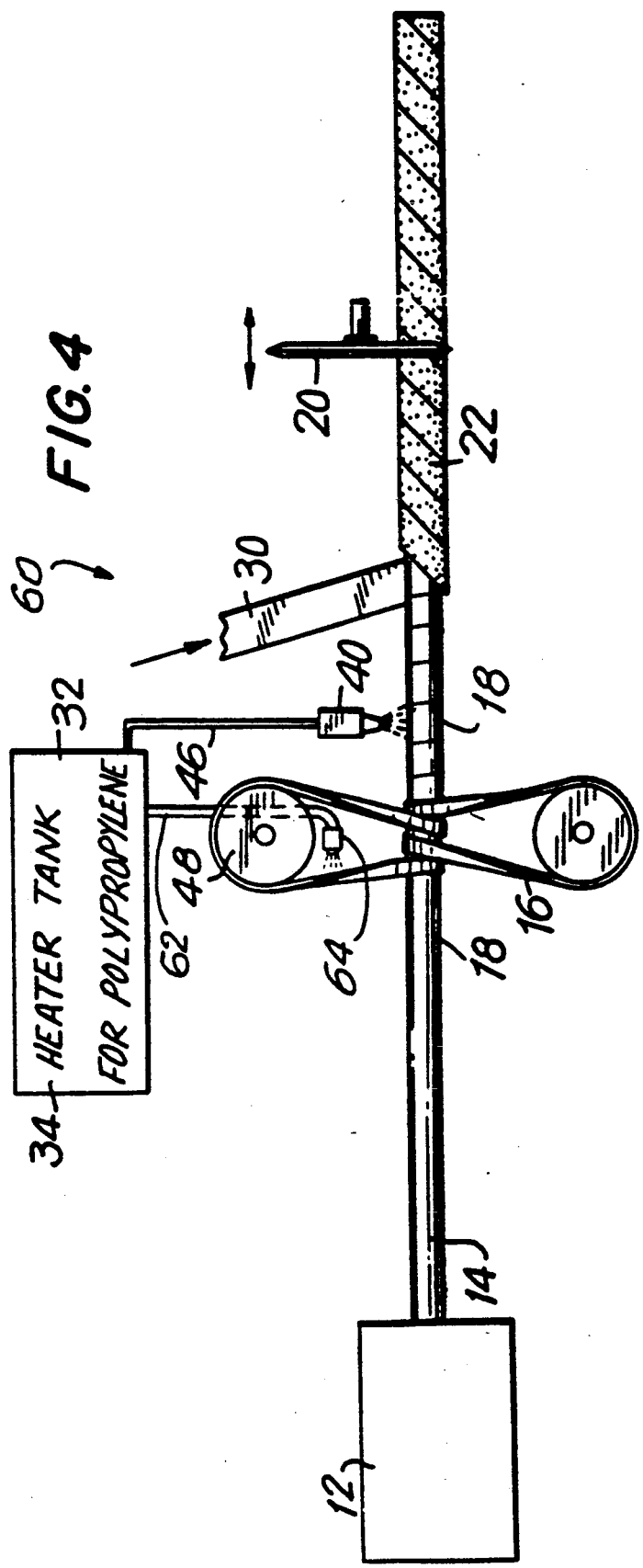

METHOD OF MAKING A PAINT ROLLER

This is a continuation of U.S. application Ser. No. 806,809, filed Dec. 6, 1991, abandoned, which is a continuation of U.S. application Ser. No. 660,970, filed Feb. 26, 1991, abandoned, which is a continuation of U.S. application Ser. No. 512,795, filed Apr. 25, 1990, abandoned, which is a continuation-in-part of U.S. application Ser. No. 394,073, filed Aug. 15, 1989, abandoned.

BACKGROUND OF THE INVENTION

1. Field of the Invention

This invention pertains to a method and apparatus for making paint rollers of the type used for applying paint to walls and the like.

2. Prior Art

Paint rollers are widely used by professionals and amateurs for applying paint to walls, ceilings, and other surfaces. Typically the roller is used with an applicator having a handle terminating in a rotatable member to which the roller is secured. The roller itself comprises two main components, a core and a paint absorbing cover. The core is typically paper or plastic, while the cover may be wool, polyester, etc. Generally speaking, the methods used for forming the core and for securing the cover to the core determine whether the roller is reusable, as paint solvents such as turpentine, mineral spirits, etc. are also solvents for many adhesives.

To speed production and reduce costs, paint rollers are manufactured using an automated assembly line. For example, according to one known technique, a disposable roller is made by first feeding three chipboard paper strips at an angle to a mandril for overlapping, helical winding to form an endless, belt driven core. The paper strips are supplied in rolls for mounting on spindles for continuous feeding, and a continuous adhesive stream is applied to the outer surfaces of the strips as they feed off the rollers such that the strips adhere together as they are helically wound to form the core. Because the roller is intended as a throwaway, the adhesive is not critical, and an inexpensive adhesive, such as a water soluble white glue, is used. As the endless core is belt driven down the line, it reaches a second adhesive applicator where a continuous adhesive stream is applied to the outer surface of the core after which a continuous strip of the cover material, such as polyester, is helically wound on to the core where it is secured by the adhesive. All that remains is to cut the resulting endless roller down to usable sizes, which is usually accomplished in two steps, first using a fly away cutter to cut, e.g., 64 inch stock, and then using a recutter to cut the stock into lengths of, e.g., seven or nine inches. The rollers thus formed may not be reused, as the adhesive which binds the core and secures the cover to the core is soluble in paint solvents, and consequently any attempt to clean the roller leads to unravelling of the core and separation of the core from the cover.

If reusable rollers are desired, phenolic impregnated paper strips are substituted for the chipboard strips in the process described above, and a thermosetting glue is used for securing the core. Thereafter, the core is heated in a multi-stage infrared heater, after which a hot melt glue is applied to the core's outer surface. The rollers are then completed as before, i.e. by helically winding the fabric cover on to the core and then cutting the resulting endless roller into usable lengths. The obvious drawback of reusable cores formed in this manner is that they require a longer assembly line, due to the need of a heater, and because the phenolic must be heated to a predetermined temperature, there is an obvious trade off between the number of heater stages and the speed of the line. Moreover, while the resulting rollers are termed reusable because they do not separate when placed in paint solvents, prolonged exposure to such solvents, e.g. about two days, does result in separation.

Another reusable roller is disclosed in U.S. Pat. No. 4,692,975 issued to Garcia. Rather than using helically wound strips to form the core, the Garcia roller is formed using a core comprised of preformed thermoplastic (e.g. polypropylene) tubular stock. With the core mounted on a rotating spindle, a movable carriage mounted at an angle to the spindle feeds a continuous strip of fabric, the carriage moving parallel to the spindle in timed relation to its rotation so that the fabric strip is wound on the plastic core in a tight helix. Also mounted to the movable carriage is a heat source for heat-softening the thermoplastic core just in advance of the point where the fabric strip is applied, such that the fabric is bonded to the core as it is wound thereon. One advantage of the roller disclosed in the Garcia patent is that it is reusable, as the bond formed between cover and core is a strong one not subject to separation from exposure to paint solvents. Another advantage is that the manufacturing process does not require the application of an adhesive to bond the cover to the core. There are, however, drawbacks. For one, while prior art techniques use rolls of, e.g., chipboard or paper, the Garcia process requires preformed thermoplastic tubular cores which are considerably bulkier than rolls, more expensive to transport, and more difficult to handle. Another drawback is the anticipated speed limit of the Garcia process dictated by the necessity that the heater, which advances along the core just in front of the fabric strip, move slow enough to insure softening of the thermoplastic core, in the absence of which the fabric cover will not bond.

SUMMARY OF THE INVENTION

In accordance with a first embodiment of the present invention, paint rollers are formed from one or more strips of thermoplastic material, preferably polypropylene, wound together in overlapping relation about a stationary mandril to form a core, to which a cover is applied. The thermoplastic strips comprising the core are bonded together by a thermoplastic material, again preferably polypropylene, which is applied to the strips in liquid form, as by sufficiently heating the polypropylene in a demand melter to liquefy it, and then feeding it to the strips via feed tubes extending from the melter. The thermoplastic strips are rapidly bonded to each other to form the core as the liquid polypropylene cools and sets. After the core is formed, an adhesive, preferably additional liquid polypropylene, is applied to the outer surface of the core whereupon a fabric cover, comprised for example of polyester, is wound about the core and bonded thereto as the liquid polypropylene cools and sets. The resulting roller is reusable owing to the strength of the polypropylene bonding, which resists separation upon immersion in paint solvents, even with exposure over several days.

In accordance with a second embodiment of the present invention, liquefied thermoplastic is applied to a belt which transfers the rapid setting liquefied thermoplastic to the stationary mandril. Since the liquefied thermoplastic does not stick to the metal surface of the mandril, a coating forms about the mandril. This thermoplastic coating sets to form the core.

The rollers of the invention are preferably formed using an assembly line process, which is simplified by the fact that the process for making the paint rollers of the invention uses many components common to prior art systems for making paint rollers. Furthermore, when an assembly line process is used, it is expected to be quite fast, as the polypropylene may be liquified at a location remote from the assembly line, whereby the process need not be slowed to accommodate on-line heating. Furthermore, because of the rapidity with which liquid polypropylene sets under ambient conditions, it is anticipated that the endless roller formed on the assembly line may be cut almost immediately after the fabric cover is applied, thereby allowing the assembly line to be kept quite short while still yielding a strongly bonded, reusable roller.

BRIEF DESCRIPTION OF THE DRAWINGS

In the drawings:

FIG. 1 diagrammatic representation of an apparatus suitable for making rollers in accordance with a first embodiment of the present invention;

FIG. 2 is a perspective view of a roller made in accordance with the present invention;

FIG. 3 is a sectional view taken substantially along line 3—3 in FIG. 2; and

FIG. 4 is a diagrammatic representation of an apparatus suitable for making rollers in accordance with a second embodiment of the present invention.

DETAILED DESCRIPTION OF THE PREFERRED EMBODIMENT

Referring now to the drawings, and initially to FIG. 1, an apparatus suitable for making rollers in accordance with a first embodiment of the present invention is generally designated at 10. One advantage of the apparatus 10 is that it incorporates several components common to widely used prior art systems, and hence is easily retrofitted. These components include a housing 12 supporting a stationary mandril 14, a driven belt 16 wound about the formed core 18 for advancing it to the right in FIG. 1, a flyaway cutter 20 for cutting the formed endless roller 22 into usable lengths, and journaled spindles (not shown) for supporting the three rolls (also not shown) from which the strips 24, 26, 28 and 30 are drawn. Components not found in prior art systems are a demand heater 32 for maintaining a liquid supply of thermoplastic material, preferably liquid polypropylene 34, applicators 36, 38 and 40 connected by, respectively, feed tubes 42, 44 and 46 to heater 32 for applying the liquid polypropylene at predetermined points in the process, and the use of thermoplastic strips 24, 26 and 28, again preferably polypropylene, to form the core 18.

An advantage of the invention is that it employs rolls of polypropylene strips which are easy to handle and readily substituted for the rolls of chipboard and paper strips common in prior art processes. As diagrammatically illustrated in FIG. 1, and in accordance with known techniques, three polypropylene strips 24, 26 and 28 are fed at an angle to the mandril 14, two from one side and one from the other. To start the process, and as is also known in the art, the free ends of the strips 24, 26 and 28, which are typically 2 11/16", 2¾" and 2 13/16"wide, are manually wound about the mandril 14 until they extend beyond the belt 16, at which point the belt is tightly wrapped about the strips and driven by activating driven wheel 48, whereupon the belt advances the formed core 18 to the right in FIG. 1 thereby continuously pulling fresh lengths of the polypropylene strips 24, 26 and 28 onto the stationary mandril 14. As shown, the strip 24 is fed over the mandril 14 and the strips 26, 28 are fed under the mandril such that all three strips are advanced to the right in FIG. 1 by the rotation of the belt 16, and preferably the strips 24, 26 and 28 are wound in tight helical paths.

Still referring to FIG. 1, the applicators 36, 38 apply liquid polypropylene from the demand melter 34 to the outer surfaces of the strips 26, 28 just before they are wound on the mandril 14. The demand melter is set to maintain its interior at a temperature sufficiently high to insure that the polypropylene therein is in liquid form. As the strips 24, 26 and 28 are wound onto the mandril in overlapping fashion by the advancing action of the belt 16, the liquid polypropylene is disposed between the overlapping strips, and because the strips are also comprised of polypropylene, the overlapping strips are rapidly bonded to each other as the liquid polypropylene cools and sets, thereby forming an integral endless core 18.

Next, additional liquid polypropylene is applied onto the outer surface of the core 18 by the applicator 40 which is situated just to the right of the belt 16 in FIG. 1. Immediately thereafter, the fabric cover 30, which may comprise any of the conventional materials now in use, such as polyester, is wound onto the core 18, whereupon it is rapidly bonded to the core as liquid polypropylene cools and sets. Again, because the core is also formed of polypropylene, the strong bond is formed between the core 18 and the fabric cover 30. It will be appreciated that in accordance with known techniques, winding of the fabric cover 30 onto the core 18 is started manually, just like the strips 24, 26 and 28, and that fresh lengths of the fabric strip 30 are then continuously pulled onto the core 18 by the advancement of the core 18 to the right as effected by the belt 16. Again, the cover strip 30 is preferably wound in a tight helical path about the core.

At this point, all that remains is to cut the now formed endless roller 22 into usable lengths. Because the polypropylene bonds which secure the core 18 and hold the fabric cover 30 to the core set rapidly with the cooling of the liquid polypropylene, it is anticipated that the flyaway cutter for cutting the endless roller 22 may be positioned quite close to the ontake of the fabric cover 30. The actual position of the flyaway cutter 20 can, of course, be adjusted as necessary to insure that the cutting operation is not effected before the bonds set. As is common, the flyaway cutter may be adjusted to cut the endless roller 22 into 64" stock, which may then be recut to the usual 7" and 9" sizes.

A finished roller 50 in accordance with the invention is shown in FIG. 2, and in cross-section in FIG. 3. The roller 50 may be used in the same manner as prior art rollers, namely, as a replacement element or, with the addition of end pieces 52 and a handle 54, as part of a complete roller assembly. In FIG. 3, 56 represents the polypropylene bond joining the fabric cover 30 to the core 18. Because polypropylene bonds are not soluble in paint solvents, the rollers 50 produced in accordance with the invention are reusable. Indeed, because the core 18 itself comprises polypropylene, the roller 50 defines a substantially integral assembly, and it is expected that separation of the fabric 30 from the core 18 will not occur even if the roller is exposed to a paint solvent over a period of several days.

Referring now to FIG. 4 a second embodiment of an apparatus in accordance with the present invention is generally designated at 60. As shown, strips 24, 26 and 28, feed tubes 42, 44 and applicators 36, 38 of the apparatus 10 of FIG. 1 have all been eliminated from apparatus 60. A feed tube 62 and an applicator 64 feed liquefied polypropylene 34 from heater tank 32 for application to driven belt 16. The driven belt 16 is formed of a material such as rubber or teflon compound to which liquid polypropylene 34 does not adhere. Driven belt 16 is tightly wrapped around mandril 14 such that the liquid polypropylene 34 applied to belt 16 is transferred to mandril 14 by driven belt 16. Mandril 14 is preferably composed of a suitable metal. When transferred to mandril 14 the liquid polypropylene 34 forms a coating thereabout, but does not adhere to the stationary mandril, which is formed of metal. The coating is applied evenly about the mandril as the belt 16 rotates thereabout. The coating sets rapidly to form a core 18 which is then continuously advanced to the right by the rotational motion of the belt 16. Applicator 40, located preferably 12-18 inches from driven belt 16, applies liquid polypropylene to core 18 in the same manner and for the same purpose as in the apparatus 10 of FIG. 1.

Apart from the advantage of producing extremely well bonded, reusable rollers, the invention provides several manufacturing advantages. For one, because of the rapidity with which the polypropylene bonds set, the assembly line can be kept quite short, with the flyaway cutter, the final component on the line, positioned close to the ontake of fabric strip 30. Also, because the polypropylene is preheated to a liquid state in the heater 32, which may be remotely located, there is no need for a heating element in proximity to the assembly line, and consequently the line need not be slowed to accommodate on-line heating. Therefore, it is anticipated that the line can be run quite fast, thereby increasing production and reducing unit cost. Another advantage, noted above, is that the method of the invention forms the core and cover from strips, just like the prior art methods, and therefore is easily retrofitted to existing systems using several of their components which, of course, is less expensive than a new installation. Also, as compared with those prior art systems which utilize prefabricated tubular stock for the roller core, the present invention's reliance on polypropylene strips is superior, as strips, which come in rolls, are less bulky and easier to handle. Their lesser bulk also reduces transportation costs.

In place of fabric cover 30 a flocking head (not shown) may be used to apply a suitable cover material, such as blown-on fibers, to core 18.

While the foregoing describes and illustrates the preferred embodiment of the present invention and suggests certain modifications thereto, those of ordinary skill in the art will recognize that still further changes and modifications may be made therein without departing from the spirit and scope of the invention. Accordingly, the above description should be construed as illustrative and not in a limiting sense, the scope of the invention being defined by the following claims.

I claim:

1. A method for making a paint roller comprising:
   winding a plurality of strips of thermoplastic material onto a mandril in overlapping relation;
   advancing said wound strips in a direction coaxial with said mandril;
   liquefying a supply of thermoplastic material;
   applying said liquid thermoplastic material to said strips before winding said strips on said mandril, thereby bonding said strips to each other and forming an endless core;
   applying an adhesive to an outer surface of said core;
   applying a cover about said core over said adhesive, thereby bonding said cover to said core and forming an endless roller: and
   cutting said endless roller into usable lengths.

2. The method of claim 1, wherein said adhesive comprises a liquid thermoplastic material.

3. The method of claim 1, wherein said adhesive and said thermoplastic material comprise polypropylene.

4. The method of claim 1, wherein said thermoplastic strips are wound in helical paths.

5. The method of claim 1, wherein said advancing step comprises wrapping a belt around said core and rotating said belt.

6. The method of claim 1, wherein said liquefying step comprises heating said thermoplastic material.

7. The method of claim 1 wherein the step of applying a cover comprises winding a cover strip about said core.

8. A method for making a paint roller comprising:
   winding one or more strips of thermoplastic material in overlapping relation, thereby forming a tubular core;
   applying a liquid thermoplastic material to said one or more strips, thereby bonding said one or more strips together;
   applying an adhesive to an outer surface of said core;
   wrapping a cover about said core over said adhesive, thereby bonding said cover to said core and forming said roller.

9. The method of claim 8, wherein said adhesive comprises a liquid thermoplastic material.

10. The method of claim 8, wherein the thermoplastic material and said adhesive comprise polypropylene.

11. The method of claim 8, wherein said thermoplastic strips are wound in a helical path.

12. A method for making a paint roller comprising:
   winding a plurality of strips of thermoplastic material onto a mandril in overlapping relation;
   advancing said wound strips in a direction coaxial with said mandril;
   liquefying a supply of thermoplastic material by means of a liquefier;
   supplying the liquid thermoplastic material from the liquefier means;
   applying said liquid thermoplastic material supplied in said supplying step to said strips before winding said strips on said mandril, thereby bonding said strips to each other and forming an endless core;
   applying said liquid thermoplastic material supplied in said supplying step to an outer surface of said core;
   applying a cover about said core over said adhesive, thereby bonding said cover to said core and forming an endless roller; and
   cutting said endless roller into usable lengths.

* * * * *